US011278034B2

United States Patent
Gonzalez (10) Patent No.: US 11,278,034 B2
(45) Date of Patent: Mar. 22, 2022

(54) PORTABLE FISH CLEANING DEVICE

(71) Applicant: Clyde Gonzalez, Corpus Christi, TX (US)

(72) Inventor: Clyde Gonzalez, Corpus Christi, TX (US)

(*) Notice: Subject to any disclaimer, the term of this patent is extended or adjusted under 35 U.S.C. 154(b) by 13 days.

(21) Appl. No.: 16/869,216

(22) Filed: May 7, 2020

(65) Prior Publication Data
US 2021/0345627 A1 Nov. 11, 2021

(51) Int. Cl.
| | | |
|---|---|---|
| *A22C 25/06* | (2006.01) | |
| *A22C 25/18* | (2006.01) | |
| *A22C 25/14* | (2006.01) | |
| *A47B 13/16* | (2006.01) | |
| *A01K 97/22* | (2006.01) | |
| *A01K 97/06* | (2006.01) | |
| *A47B 3/08* | (2006.01) | |
| *A47B 5/04* | (2006.01) | |
| *A47B 5/06* | (2006.01) | |

(52) U.S. Cl.
CPC .............. *A22C 25/06* (2013.01); *A01K 97/06* (2013.01); *A01K 97/22* (2013.01); *A22C 25/14* (2013.01); *A22C 25/18* (2013.01); *A47B 3/0818* (2013.01); *A47B 5/04* (2013.01); *A47B 5/06* (2013.01); *A47B 13/16* (2013.01)

(58) Field of Classification Search
CPC ........................................................ A22C 25/06
USPC ................................................. 452/194, 195
See application file for complete search history.

(56) References Cited

U.S. PATENT DOCUMENTS

| | | | |
|---|---|---|---|
| 3,590,423 A * | 7/1971 | Messer ................. | A22C 25/06 452/194 |
| D264,531 S | 5/1982 | Trode | |
| 4,454,628 A | 6/1984 | Olson | |
| 5,116,279 A | 5/1992 | Perry | |
| 5,522,765 A | 6/1996 | Dotson | |
| 5,542,359 A | 8/1996 | Polries | |
| 5,649,734 A | 7/1997 | Speis | |
| 5,860,367 A | 1/1999 | Riegel | |
| 6,942,562 B2 * | 9/2005 | Kallas ................... | A22C 25/06 452/195 |
| 7,040,977 B1 * | 5/2006 | Kline ................... | A22C 25/025 452/195 |
| 7,390,249 B2 * | 6/2008 | Sorey .................. | A22C 25/025 452/195 |
| 7,674,163 B2 * | 3/2010 | Howard ................ | A22C 25/06 452/195 |

(Continued)

*Primary Examiner* — David J Parsley (57) ABSTRACT

A portable fish cleaning assembly includes a platform that has a drink aperture, a tool aperture, a plurality of hook apertures and a pair of storage holes each extending therethrough. A pair of grapples is each removably coupled to the platform. Each of the grapples releasably engages a top pier rail having the platform being horizontally oriented on the top pier rail. In this way a fish can be positioned on the platform for filleting the fish. A pair of legs is each pivotally coupled to the platform. Each of the legs extends downwardly from the platform when the legs are positioned in a deployed position. In this way each of the legs abuts horizontal pier rails thereby retaining the platform in the horizontal orientation. A clamp is pivotally coupled to the platform to engage the fish for retaining the fish on the platform for filleting the fish.

11 Claims, 7 Drawing Sheets

(56) References Cited

U.S. PATENT DOCUMENTS

| | | | |
|---|---|---|---|
| 8,376,816 B2 * | 2/2013 | Redford | A22C 25/16 |
| | | | 452/195 |
| 10,827,761 B1 * | 11/2020 | Graham | A47B 5/06 |
| 10,993,533 B2 * | 5/2021 | Williamson | A47B 91/08 |
| 2003/0096569 A1 | 5/2003 | Britton | |
| 2007/0178820 A1 | 8/2007 | Tylman | |
| 2021/0076653 A1 * | 3/2021 | Leigh | A22C 25/06 |

* cited by examiner

PORTABLE FISH CLEANING DEVICE

CROSS-REFERENCE TO RELATED APPLICATIONS

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to fish cleaning devices and more particularly pertains to a new fish cleaning device for mounting on a horizontal pier rail.

BRIEF SUMMARY OF THE INVENTION

An embodiment of the disclosure meets the needs presented above by generally comprising a platform that has a drink aperture, a tool aperture, a plurality of hook apertures and a pair of storage holes each extending therethrough. A pair of grapples is each removably coupled to the platform. Each of the grapples releasably engages a top pier rail having the platform being horizontally oriented on the top pier rail. In this way a fish can be positioned on the platform for filleting the fish. A pair of legs is each pivotally coupled to the platform. Each of the legs extends downwardly from the platform when the legs are positioned in a deployed position. In this way each of the legs abuts horizontal pier rails thereby retaining the platform in the horizontal orientation. A clamp is pivotally coupled to the platform to engage the fish for retaining the fish on the platform for filleting the fish.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
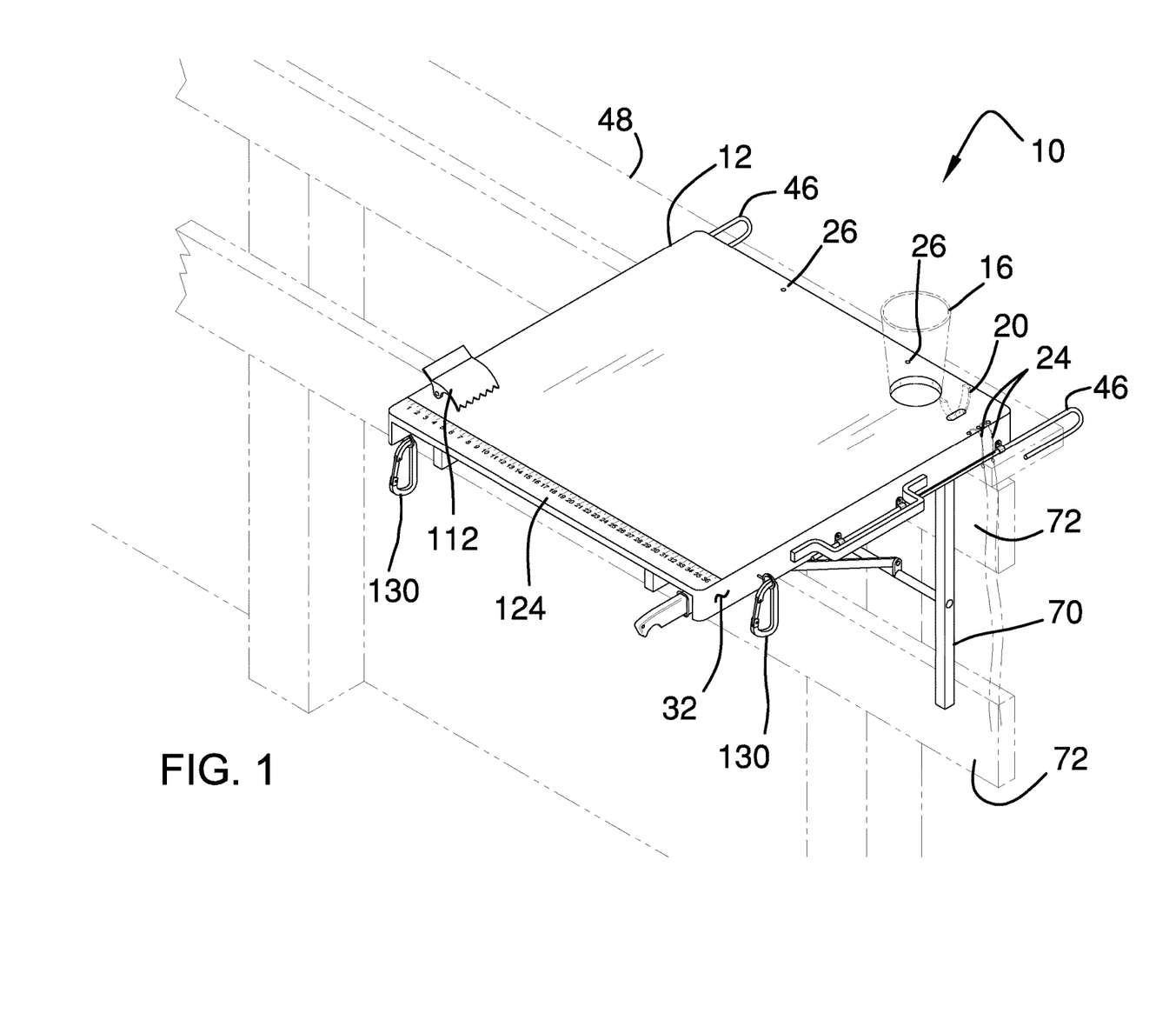
FIG. 1 is a perspective in-use view of a portable fish cleaning assembly according to an embodiment of the disclosure.
Figure 2:
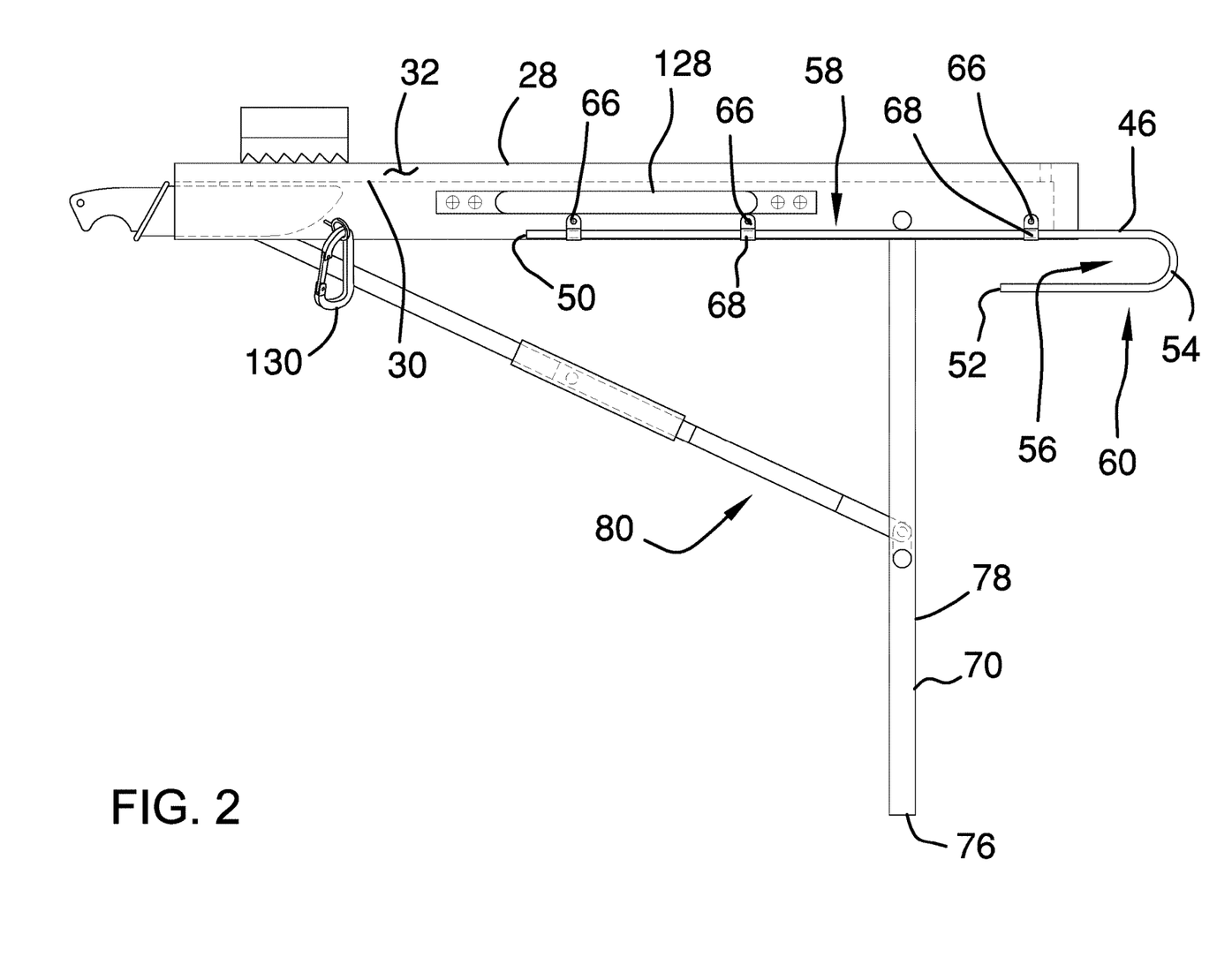
FIG. 2 is a right side view of an embodiment of the disclosure.
Figure 3:
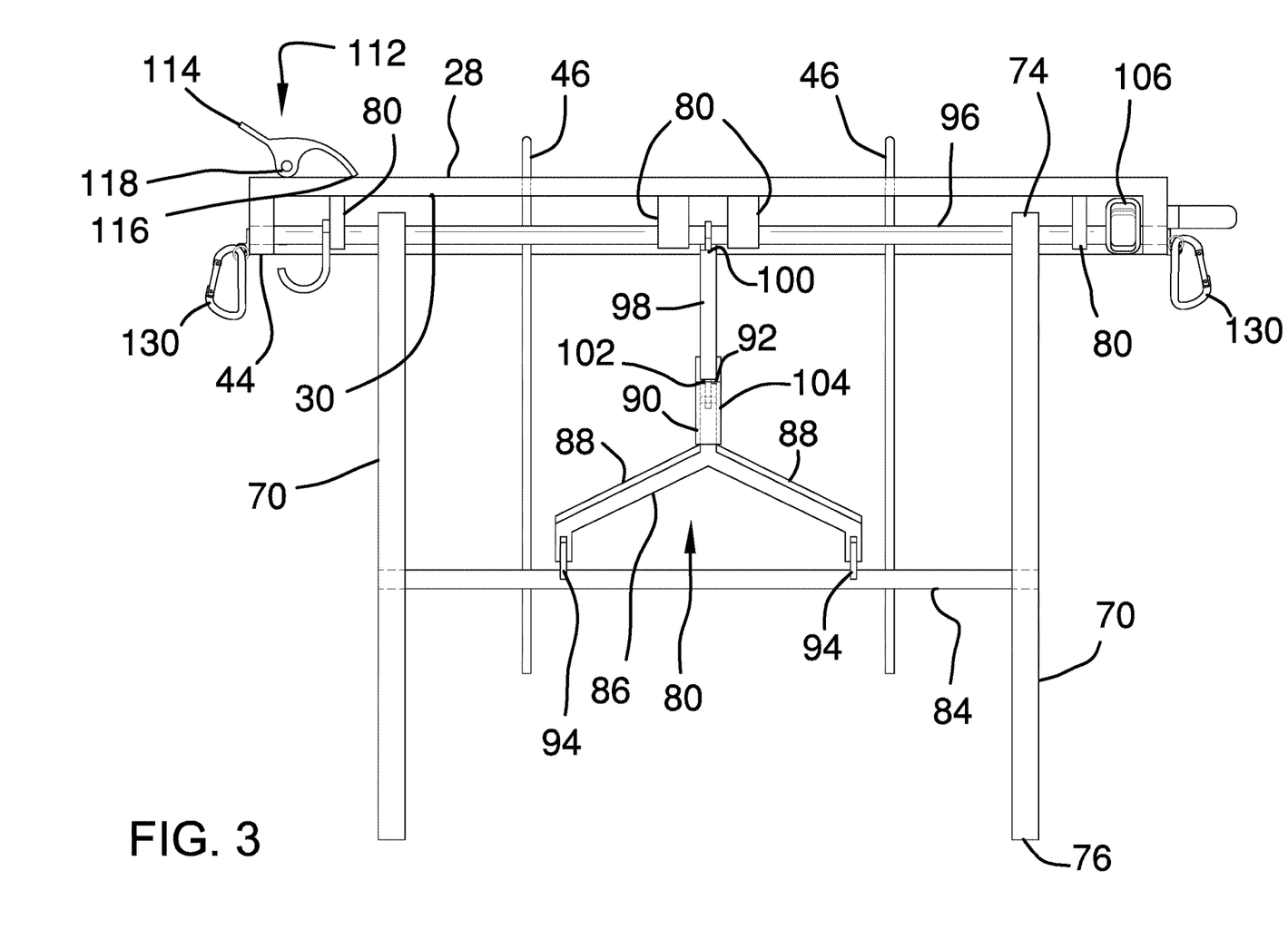
FIG. 3 is a front view of an embodiment of the disclosure.
Figure 4:
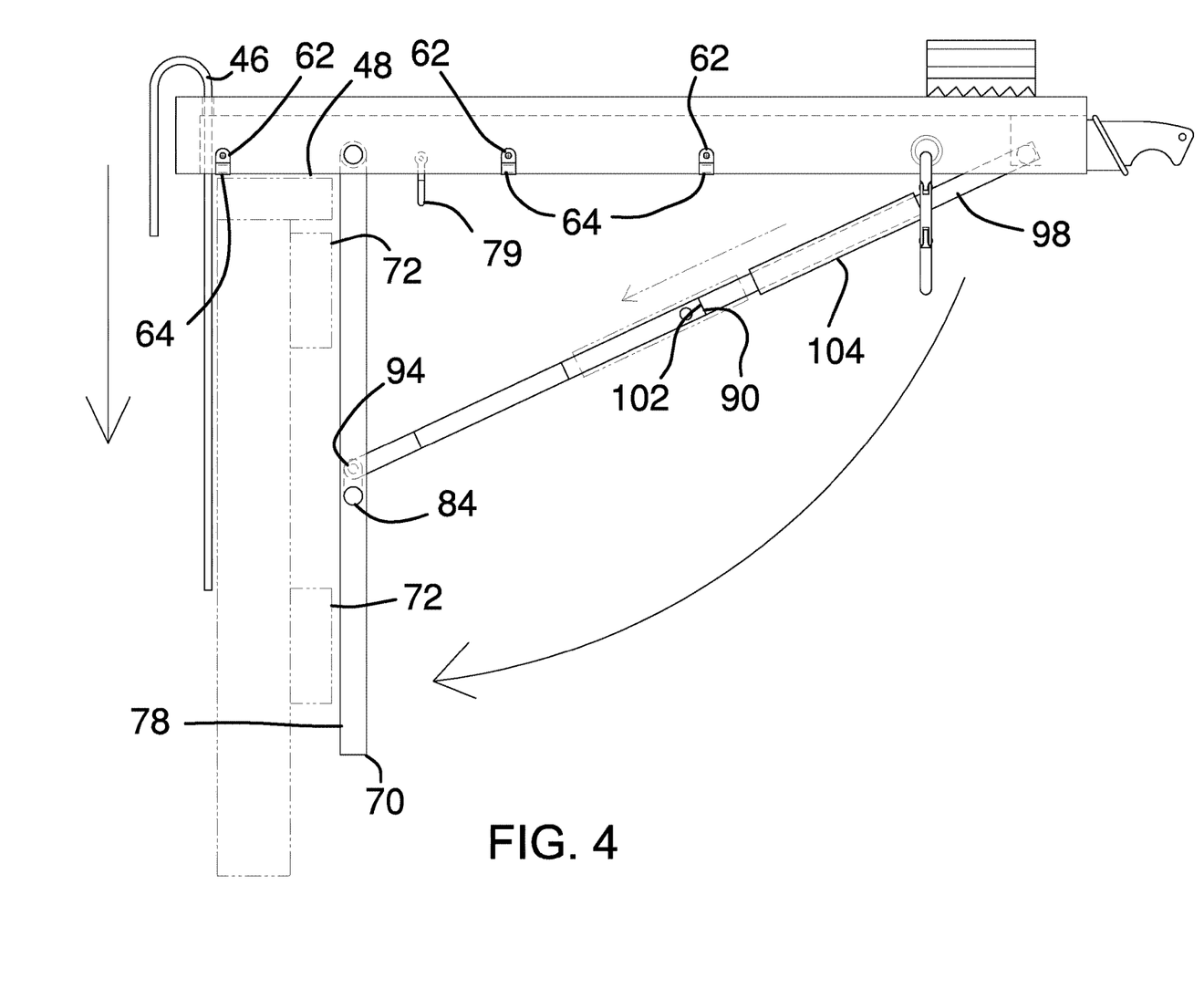
FIG. 4 is a left side view of an embodiment of the disclosure.
Figure 5:
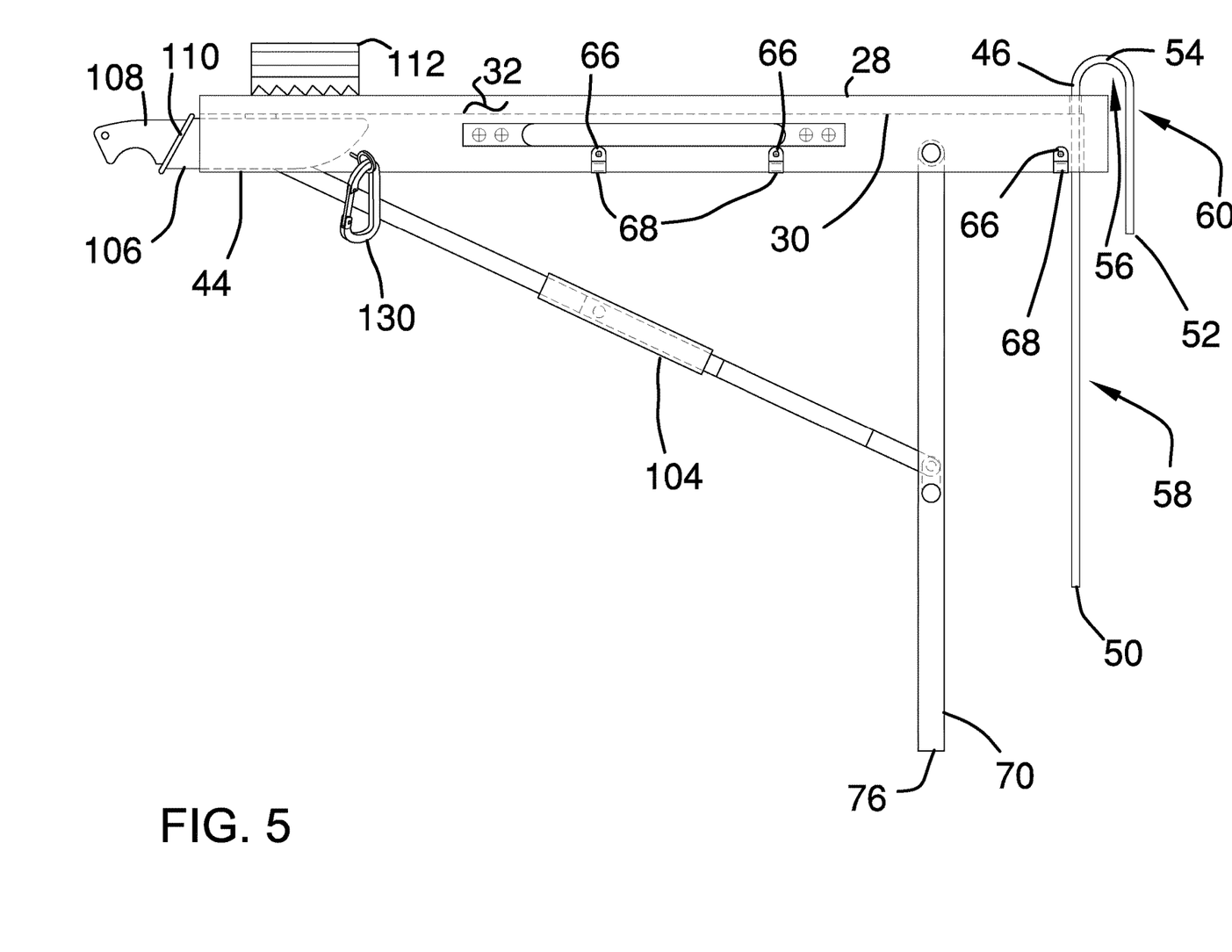
FIG. 5 is a right side perspective view of an embodiment of the disclosure.
Figure 6:
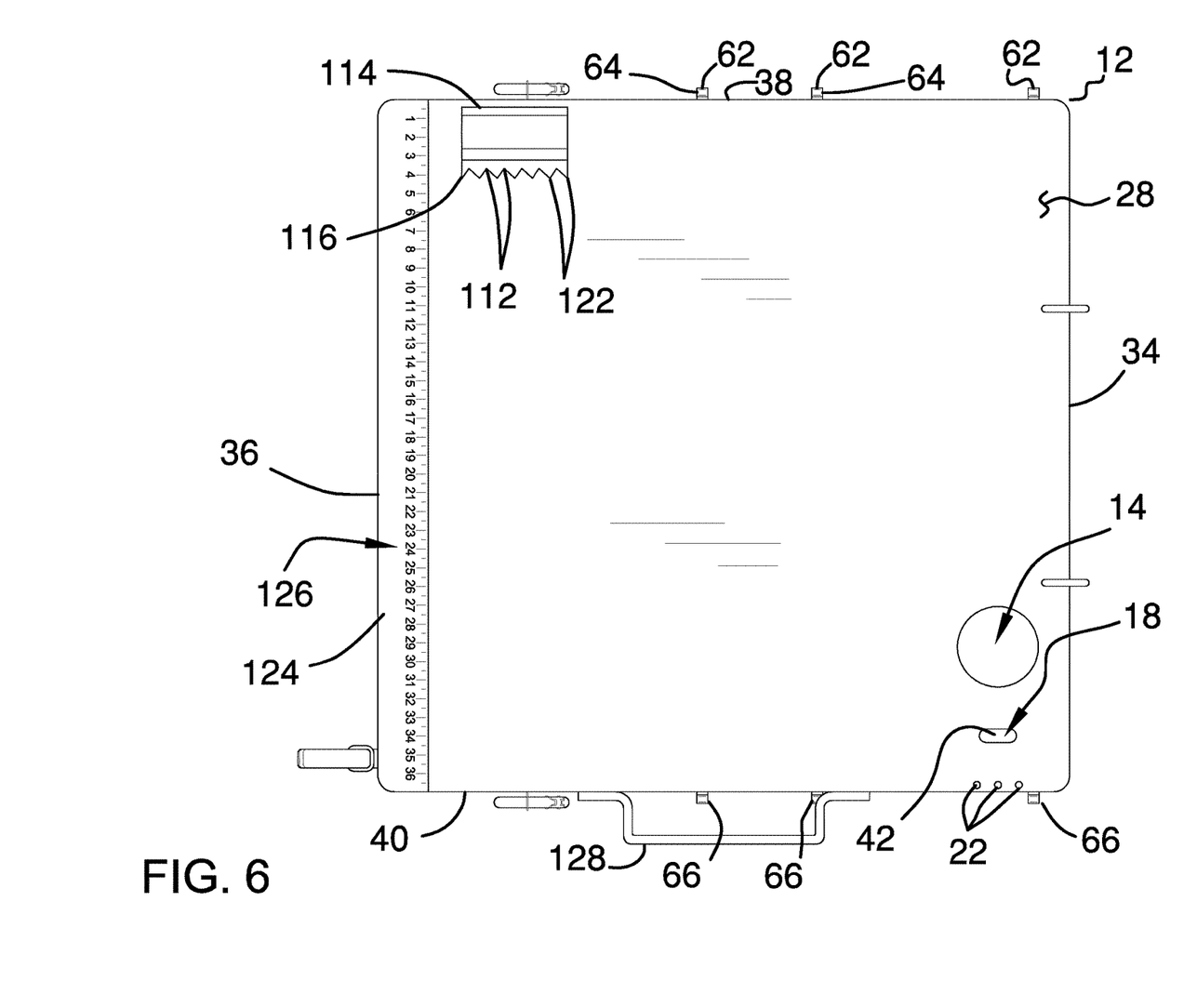
FIG. 6 is a top view of an embodiment of the disclosure.
Figure 7:
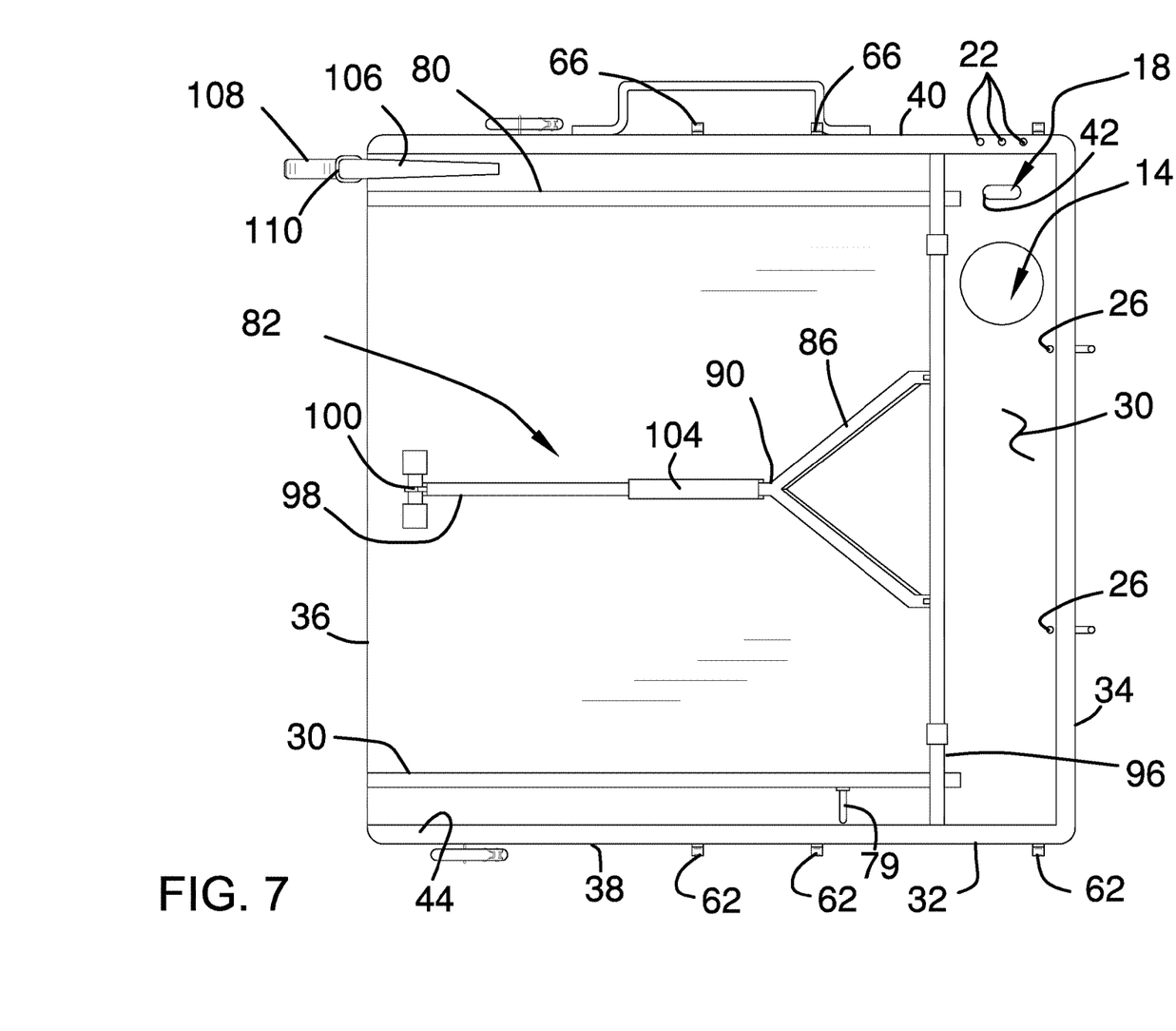
FIG. 7 is a bottom view of an embodiment of the disclosure.

With reference now to the drawings, and in particular to FIGS. 1 through 7 thereof, a new fish cleaning device embodying the principles and concepts of an embodiment of the disclosure and generally designated by the reference numeral 10 will be described.

As best illustrated in FIGS. 1 through 7, the portable fish cleaning assembly 10 generally comprises a platform 12 that has a drink aperture 14 therein to have a beverage cup 16 positioned therein for temporary storage. The platform 12 has a tool aperture 18 extending therethrough for insertably receiving a pair of pliers 20 for temporary storage. Additionally, the platform 12 has a plurality of hook apertures 22 each extending therethrough to have a hook 24 on fishing tackle positioned therein for temporary storage. The platform 12 has a pair of storage holes 26 each extending therethrough.

The platform 12 has a top surface 28, a bottom surface 30 and a perimeter surface 32 extending therebetween, and the perimeter surface 32 has a front side 34, a back side 36, a first lateral side 38 and a second lateral side 40. Each of the drink aperture 14, the tool aperture 18, the hook apertures 22 and the storage holes 26 extend through the top 28 and bottom 30 surfaces. The drink aperture 14 is positioned closer to the back side 36 than the front side 34 of the perimeter surface 32. Additionally, the drink aperture 14 is positioned closer to the second lateral side 40 than the first lateral side 38 of the perimeter surface 32. The tool aperture 18 is positioned between the drink aperture 14 and the second lateral side 40 of the perimeter surface 32. Moreover, the tool aperture 18 is elongated between the front 34 and back 36 sides of the perimeter surface 32 to accommodate handles of the pliers 20. Each of the handles of the pliers 20 abuts a bounding surface 42 of the tool aperture 18 thereby inhibiting the pliers 20 from falling through the tool aperture 18.

Each of the hook apertures 22 is positioned between the tool aperture 18 and the second lateral side 40 of the perimeter surface 32. The hook apertures 22 are spaced apart from each other and are distributed along the second lateral side 40. The storage holes 26 are spaced apart from each other and are distributed along the back side 36 of the perimeter surface 32. The bottom surface 30 has a lip 44 extending downwardly therefrom, and the lip 44 is aligned with and is coextensive with each of the first lateral 38, second lateral 40 and back 36 sides of the perimeter surface 32.

A pair of grapples 46 is provided and each of the grapples 46 is removably coupled to the platform 12. Each of the grapples 46 releasably engages a top pier rail 48. The top pier rail 48 may be a top plank on a railing of a boat pier or other fence-like structure that is located near a body of water. The platform 12 is horizontally oriented on the top pier rail 48 thereby facilitating a fish to be positioned on the platform 12 for filleting the fish.

Each of the grapples 46 is inserted into a respective one of the storage holes 26 for temporary storage. Each of the grapples 46 has a first end 50 and a second end 52, and each of the grapples 46 is elongated between first 50 and second 52 ends. Each of the grapples 46 has a bend 54 thereon defining a rail space 56 between a first portion 58 and a second portion 60 of the grapples 46. Thus, each of the grapples 46 has a J-shape. The top pier rail 48 is positioned in the rail space 56 of each of the grapples 46 having the bottom surface 30 of the platform 12 resting upon the top pier rail 48. Additionally, the bend 54 on each of the grapples 46 is positioned closer to the second end 52 than the first end 50. The first portion 58 of each of the grapples may have a length of approximately 8.0 inches and the second portion 60 of each of the grapples may have a length of approximately 4.0 inches. Additionally, the first portion 58 and the second portion 60 of each of the grapples may be spaced apart from each other a distance of approximately 2.0 inches.

A set of first retainers 62 is each coupled to the first lateral side 38 of the perimeter surface 32 of the platform 12. Each of the first retainers 62 has a curved portion 64 extending away from the first lateral side 38 and the first retainers 62 are spaced apart from each other and are distributed along the first lateral side 38. The first portion 58 of a respective one of the grapples 46 is extendable through the curved portion 64 of each of the first retainers 62 having the rail space 56 in the respective grapple 46 being spaced rearwardly from the back side 36 of the perimeter surface 32. A set of second retainers 66 is each coupled to the second lateral side 40 of the perimeter surface 32 of the platform 12. Each of the second retainers 66 has a curved portion 68 extending away from the second lateral side 40 and the second retainers 66 are spaced apart from each other and are distributed along the second lateral side 40. The first portion 58 of a respective one of the grapples 46 is extendable through the curved portion 68 of each of the second retainers 66 having the rail space 56 in the respective grapple 46 being spaced rearwardly from the back side 36 of the perimeter surface 32.

A pair of legs 70 is each pivotally coupled to the platform 12. Each of the legs 70 extends downwardly from the platform 12 when the legs 70 are positioned in a deployed position. In this way each of the legs 70 abuts horizontal pier rails 72 thereby retaining the platform 12 in the horizontal orientation. Additionally, each of the legs 70 rests against the platform 12 when the legs 70 are positioned in a stored position.

Each of the legs 70 has a top end 74, a bottom end 76 and a rear surface 78 extending therebetween. The top end 74 of each of the legs 70 is pivotally coupled to the bottom surface 30 of the platform 12. The rear surface 78 of each of the legs 70 extends downwardly from the bottom surface 30 of the platform 12 when the legs 70 are positioned in the deployed position. In this way the rear surface 78 of each of the legs 70 can abut the horizontal pier rails 72 when the platform 12 is positioned on the top pier rail 48. The top end 74 of each of the legs 70 is positioned closer to the back side 36 than the front side 34 of the perimeter surface 32 of the platform 12 and each of the legs 70 is positioned adjacent to a respective one of the first 38 and second 40 lateral sides of the perimeter surface 32.

A plurality of beams 80 is each coupled to the bottom surface 30 of the platform 12. Each of the beams 80 extends between the front 34 and back 36 sides of the perimeter surface 32 of the platform 12. Additionally, the beams 80 are spaced apart from each other and are distributed between the first 38 and second 40 lateral sides of the perimeter surface 32. A hook 79 is coupled to and extends downwardly from a respective one of the beams 80. The hook 79 has a distal end 81 with respect to the respective beam 80 and the hook 79 is curved between the distal end 81 and the respective beam 80. In this way the hook 79 can support a fishing net.

A locking unit 82 is pivotally coupled between each of the legs 70 and the platform 12. The locking unit 82 is positionable in a locked position when the legs 70 are positioned in the deployed position. Moreover, the locking unit 82 retains each of the legs 70 in the deployed position when the locking unit 82 is positioned in the locked position. In this way the locking unit 82 can support 86 the weight of the platform 12 when the platform 12 is positioned on the top pier rail 48.

The locking unit 82 comprises a member 84 that extends between each of the legs 70, and the member 84 is centrally positioned between the top 74 and bottom 76 ends of the legs 70. The locking unit 82 includes a support 86 that comprises a pair of second arms 88 each angling outwardly away from a first arm 90 such that the support 86 has a Y shape. The first arm 90 has a distal end 92 with respect to the second arms 88 and each of the second arms 88 has a distal end 94 with respect to the first arm 90. The distal end 94 of each of the second arms 88 is pivotally coupled to the member 84 having the first arm 90 being directed away from the support 86.

The locking unit 82 comprises a rod 96 that extends through each of the beams 80. The rod 96 is positioned closer to the front side 34 than the back side 36 of the perimeter surface 32 of the platform 12. The locking unit 82 includes a shaft 98 that has a primary end 100 and a secondary end 102. The primary end 100 is pivotally coupled to the rod 96 having the shaft 98 being centrally positioned with respect to the front side 34 of the perimeter surface 32. The secondary end 102 is pivotally coupled to the distal end 92 of the first arm 90 of the support 86. Each of the shaft 98 and the first arm 90 are oriented collinear with each other when the legs 70 are positioned in the deployed position. Thus, each of the shaft 98 and the support 86 lies on a line that is oriented at an angle with respect to a line extending through the top 74 and bottom 76 ends of the legs 70. Each of the shaft 98 and the support 86 lies against the bottom surface 30 of the platform 12 when the legs 70 are positioned in the stored position.

The locking unit 82 includes a tube 104 that is slidably positioned around the shaft 98. The tube 104 covers an intersection between the shaft 98 and the support 86 when the legs 70 are positioned in the deployed position. In this way the legs 70 are retained in the deployed position. The tube 104 is displaced from the intersection between the shaft 98 and the support 86 thereby facilitating the support 86 and the shaft 98 to be folded to lie against the bottom surface 30 of the platform 12. In this way the legs 70 can be positioned in the stored position.

A knife sheath 106 is coupled to the platform 12 to insertably receive a fillet knife 108 for temporary storage. The knife sheath 106 is positioned on the bottom surface 30 of the platform 12. The knife sheath 106 has an open end 110 for insertably receiving the fillet knife 108 and the open end 110 is aligned with the front side 34 of the perimeter surface 32 of the platform 12.

A clamp 112 is pivotally coupled to the platform 12 and the clamp 112 engages the fish to retaining the fish on the platform 12 for filleting the fish. The clamp 112 has a first edge 114 and a second edge 116 each extending in opposite directions from a pivot 118. The pivot 118 is pivotally coupled to the top surface 28 of the platform 12. The second edge 116 has a plurality of recesses 120 each extending toward the pivot 118 to define a plurality of teeth 122 on the second edge 116. Moreover, the second edge 116 is biased to engage the top surface 28 of the platform 12 to frictionally engage the fish. The first edge 114 is manipulated to pivot 118 the second edge 116 away from the top surface 28 thereby facilitating the fish to be positioned beneath the clamp 112 or to be removed from the clamp 112. Additionally, the clamp 112 is positioned adjacent to an intersection of the first lateral side 38 and the front side 34 of the perimeter surface 32 of the platform 12.

A ruler 124 is coupled to the platform 12 to measure the length of the fish. The ruler 124 is positioned on the top surface 28 of the platform 12, and the ruler 124 is aligned with and is coextensive with the front side 34 of the perimeter surface 32 of the platform 12. The ruler 124 has measuring indicia 126 printed thereon comprising graduated increments of distance, such as inches or centimeters. A handle 128 is coupled to the perimeter surface 32 of the platform 12 for carrying the platform 12. A pair of D-rings 130, or other similar releasable coupler, is provided and each of the D-rings 130 are suspended from the platform 12 support 86 supporting various objects when the platform 12 is positioned on the top pier rail 48.

In use, each of the legs 70 is positioned into the deployed position and the tube 104 is slid over the intersection between the shaft 98 and the support 86 to lock the legs 70 in the deployed position. Each of the grapples 46 is slid into the respective first 62 and second 66 receivers. The platform 12 is rested upon the top pier rail 48, the top pier rail 48 is inserted into the rail space 56 in each of the grapples 46 and the rear surface 78 of each of the legs 70 abuts the horizontal pier rails 72. In this way the platform 12 is retained on the top pier rail 48 on a horizontal plane for filleting fish. Thus, fish can be cleaned and filleted on a pier or the like when a fish cleaning station is not available.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A portable fish cleaning assembly being configured to be temporarily mounted to a pier rail for filleting fish, said assembly comprising:

a platform having a drink aperture therein wherein said drink aperture is configured to have a beverage cup positioned therein for temporary storage, said platform having a tool aperture extending therethrough wherein said tool aperture is configured to insertably receive a pair of pliers for temporary storage, said platform having a plurality of hook apertures each extending therethrough wherein each of said hook apertures is configured to have a hook on fishing tackle positioned therein for temporary storage, said platform having a pair of storage holes each extending therethrough;

a pair of grapples, each of said grapples being removably coupled to said platform, each of said grapples releasably engaging a top pier rail wherein said platform is configured to be horizontally oriented on the top pier rail thereby facilitating a fish to be positioned on said platform for filleting the fish, each of said grapples being inserted into a respective one of said storage holes for temporary storage;

a pair of legs, each of said legs being pivotally coupled to said platform, each of said legs extending downwardly from said platform when said legs are positioned in a deployed position wherein each of said legs are configured to abut horizontal pier rails thereby retaining said platform in the horizontal orientation, each of said legs resting against said platform when said legs are positioned in a stored position;

a locking unit being pivotally coupled between each of said legs and said platform, said locking unit being positionable in a locked position when said legs are positioned in said deployed position, said locking unit retaining each of said legs in said deployed position when said locking unit is positioned in said locked position thereby facilitating said locking unit to support the weight of said platform when said platform is positioned on the top pier rail;

a clamp being pivotally coupled to said platform wherein said clamp is configured to engage the fish for retaining the fish on said platform for filleting the fish;

a ruler being coupled to said platform wherein said ruler is configured to measure the length of the fish;

wherein said platform has a top surface, a bottom surface and a perimeter surface extending therebetween, said perimeter surface having a front side, a back side, a first lateral side and a second lateral side, each of said drink aperture, said tool aperture, said hook apertures and said storage holes extending through said top and bottom surfaces;

wherein said drink aperture is positioned closer to said back side than said front side of said perimeter surface, said drink aperture being positioned closer to said second lateral side than said first lateral side of said perimeter surface, said tool aperture being positioned between said drink aperture and said second lateral side of said perimeter surface, said tool aperture being elongated between said front and back sides of said perimeter surface wherein said tool aperture is configured to accommodate handles of the pliers having said handles abutting a bounding surface of said tool aperture thereby inhibiting the pliers from falling through said tool aperture, each of said hook apertures being positioned between said tool aperture and said second lateral side of said perimeter surface, said hook apertures being spaced apart from each other and being distributed along said second lateral side, said storage holes being spaced apart from each other and being distributed along said back side of said perimeter surface;

wherein said bottom surface has a lip extending downwardly therefrom, said lip being aligned with and being coextensive with each of said first lateral, second lateral and back sides of said perimeter surface;

wherein each of said grapples has a first end and a second end, each of said grapples being elongated between first and second ends, each of said grapples having a bend thereon defining a rail space between a first portion and a second portion of said grapples wherein said rail space is configured to have the top pier rail being positioned therein having said bottom surface of said platform resting upon the top pier rail, said bend on each of said grapples being positioned closer to said second end than said first end; and a set of first retainers, each of said first retainers being coupled to said first lateral side of said perimeter surface of said platform, each of said first retainers having a curved portion extending away from said first lateral side, said first retainers being spaced apart from each other and being distributed along said first lateral side, said first portion of a respective one of said grapples being extendable through said curved portion of each of said first retainers having said rail space in said respective grapple being spaced rearwardly from said back side of said perimeter surface.

2. The assembly according to claim 1, further comprising a set of second retainers, each of said second retainers being coupled to said second lateral side of said perimeter surface of said platform, each of said second retainers having a curved portion extending away from said second lateral side, said second retainers being spaced apart from each other and being distributed along said second lateral side, said first portion of a respective one of said grapples being extendable through said curved portion of each of said second retainers having said rail space in said respective grapple being spaced rearwardly from said back side of said perimeter surface.

3. The assembly according to claim 1, wherein each of said legs has a top end, a bottom end and a rear surface extending therebetween, said top end of each of said legs being pivotally coupled to said bottom surface of said platform, said rear surface extending downwardly from said bottom surface of said platform when said legs are positioned in said deployed position wherein said rear surface of each of said legs is configured to abut the horizontal pier rails, said top end of each of said legs being positioned closer to said back side than said front side of said perimeter surface of said platform, each of said legs being positioned adjacent to a respective one of said first and second lateral sides of said perimeter surface.

4. The assembly according to claim 1, further comprising a plurality of beams, each of said beams being coupled to said bottom surface of said platform, each of said beams extending between said front and back sides of said perimeter surface of said platform, said beams being spaced apart from each other and being distributed between said first and second lateral sides of said perimeter surface.

5. The assembly according to claim 1, further comprising a knife sheath being coupled to said platform wherein said knife sheath is configured to insertably receive a knife for temporary storage, said knife sheath being positioned on said bottom surface of said platform, said knife sheath having an open end for insertably receiving the knife, said open end being aligned with said front side of said perimeter surface of said platform.

6. The assembly according to claim 1, wherein said clamp has a first edge and a second edge each extending in opposite directions from a pivot, said pivot being pivotally coupled to said top surface of said platform, said second edge having a plurality of recesses each extending toward said pivot to define a plurality of teeth on said second edge, said second edge being biased to engage said top surface of said platform wherein said second edge is configured to frictionally engage the fish, said first edge being manipulated to pivot said second edge away from said top surface thereby facilitating the fish to be positioned beneath said clamp or to be removed from said clamp, said clamp being positioned adjacent to an intersection of said first lateral side and said front side of said perimeter surface of said platform.

7. The assembly according to claim 6, wherein said ruler is positioned on said top surface of said platform, said ruler being aligned with and being coextensive with said front side of said perimeter surface of said platform, said ruler having measuring indicia being printed thereon comprising graduated increments of distance.

8. A portable fish cleaning assembly being configured to be temporarily mounted to a pier rail for filleting fish, said assembly comprising:

a platform having a drink aperture therein wherein said drink aperture is configured to have a beverage cup positioned therein for temporary storage, said platform having a tool aperture extending therethrough wherein said tool aperture is configured to insertable receive a pair of pliers for temporary storage, said platform having a plurality of hook apertures each extending therethrough wherein each of said hook apertures is configured to have a hook on fishing tackle positioned therein for temporary storage, said platform having a pair of storage holes each extending therethrough;

a pair of grapples, each of said grapples being removably coupled to said platform, each of said grapples releasably engaging a top pier rail wherein said platform is configured to be horizontally oriented on the top pier rail thereby facilitating a fish to be positioned on said platform for filleting the fish, each of said grapples being inserted into a respective one of said storage holes for temporary storage;

a pair of legs, each of said legs being pivotally coupled to said platform, each of said legs extending downwardly from said platform when said legs are positioned in a deployed position wherein each of said legs are configured to abut horizontal pier rails thereby retaining said platform in the horizontal orientation, each of said legs resting against said platform when said legs are positioned in a stored position;

a locking unit being pivotally coupled between each of said legs and said platform, said locking unit being positionable in a locked position when said legs are positioned in said deployed position, said locking unit retaining each of said legs in said deployed position when said locking unit is positioned in said locked position thereby facilitating said locking unit to support the weight of said platform when said platform is positioned on the top pier rail;
a clamp being pivotally coupled to said platform wherein said clamp is configured to engage the fish for retaining the fish on said platform for filleting the fish;
a ruler being coupled to said platform wherein said ruler is configured to measure the length of the fish;
wherein said platform has a top surface, a bottom surface and a perimeter surface extending therebetween, said perimeter surface having a front side, a back side, a first lateral side and a second lateral side, each of said drink aperture, said tool aperture, said hook apertures and said storage holes extending through said top and bottom surfaces;
wherein said drink aperture is positioned closer to said back side than said front side of said perimeter surface, said drink aperture being positioned closer to said second lateral side than said first lateral side of said perimeter surface, said tool aperture being positioned between said drink aperture and said second lateral side of said perimeter surface, said tool aperture being elongated between said front and back sides of said perimeter surface wherein said tool aperture is configured to accommodate handles of the pliers having said handles abutting a bounding surface of said tool aperture thereby inhibiting the pliers from falling through said tool aperture, each of said hook apertures being positioned between said tool aperture and said second lateral side of said perimeter surface, said hook apertures being spaced apart from each other and being distributed along said second lateral side, said storage holes being spaced apart from each other and being distributed along said back side of said perimeter surface;
wherein said bottom surface has a lip extending downwardly therefrom, said lip being aligned with and being coextensive with each of said first lateral, second lateral and back sides of said perimeter surface;
wherein each of said legs has a top end, a bottom end and a rear surface extending therebetween, said top end of each of said legs being pivotally coupled to said bottom surface of said platform, said rear surface extending downwardly from said bottom surface of said platform when said legs are positioned in said deployed position wherein said rear surface of each of said legs is configured to abut the horizontal pier rails, said top end of each of said legs being positioned closer to said back side than said front side of said perimeter surface of said platform, each of said legs being positioned adjacent to a respective one of said first and second lateral sides of said perimeter surface;
a plurality of beams, each of said beams being coupled to said bottom surface of said platform, each of said beams extending between said front and back sides of said perimeter surface of said platform, said beams being spaced apart from each other and being distributed between said first and second lateral sides of said perimeter surface; and
wherein said locking unit comprises:
a member extending between each of said legs, said member being centrally positioned between said top and bottom ends of said legs; and
a support having a pair of second arms each angling outwardly away from a first arm such that said support has a Y shape, said first arm having a distal end with respect to said second arms, each of said second arms having a distal end with respect to said first arm, said distal end of each of said second arms being pivotally coupled to said member having said first arm being directed away from said support.

9. The assembly according to claim 8, wherein said locking unit comprises:
a rod extending through each of said beams, said rod being positioned closer to said front side than said back side of said perimeter surface of said platform; and
a shaft having a primary end and a secondary end, said primary end being pivotally coupled to said rod having said shaft being centrally positioned with respect to said front side of said perimeter surface, said secondary end being pivotally coupled to said distal end of said first arm of said support, each of said shaft and said first arm being oriented collinear with each other when said legs are positioned in said deployed position such that each of said shaft and said support lie on a line being oriented at an angle with respect to a line extending through said top and bottom ends of said legs, each of said shaft and said support being lying against said bottom surface of said platform when said legs are positioned in said stored position.

10. The assembly according to claim 9, wherein said locking unit comprises a tube being slidably positioned around said shaft, said tube covering an intersection between said shaft and said support when said legs are positioned in said deployed position for retaining said legs in said deployed position, said tube being displaced from said intersection between said shaft and said support thereby facilitating said support and said shaft to be folded to lie against said bottom surface of said platform.

11. A portable fish cleaning assembly being configured to be temporarily mounted to a pier rail for filleting fish, said assembly comprising:
a platform having a drink aperture therein wherein said drink aperture is configured to have a beverage cup positioned therein for temporary storage, said platform having a tool aperture extending therethrough wherein said tool aperture is configured to insertably receive a pair of pliers for temporary storage, said platform having a plurality of hook apertures each extending therethrough wherein each of said hook apertures is configured to have a hook on fishing tackle positioned therein for temporary storage, said platform having a pair of storage holes each extending therethrough, said platform having a top surface, a bottom surface and a perimeter surface extending therebetween, said perimeter surface having a front side, a back side, a first lateral side and a second lateral side, each of said drink aperture, said tool aperture, said hook apertures and said storage holes extending through said top and bottom surfaces, said drink aperture being positioned closer to said back side than said front side of said perimeter surface, said drink aperture being positioned closer to said second lateral side than said first lateral side of said perimeter surface, said tool aperture being positioned between said drink aperture and said second lateral side of said perimeter surface, said tool aperture being elongated between said front and back sides of said perimeter surface wherein said tool aperture is configured to accommodate handles of the pliers having said handles abutting a bounding surface of said tool aperture thereby inhibiting the pliers from falling through said tool aperture, each of said hook apertures being positioned between said tool aperture and said second lateral side of said perimeter surface, said hook apertures being spaced apart from each other and being distributed along said second lateral side, said storage holes being spaced apart from each other and being distributed along said back side of said perimeter surface, said bottom surface having a lip extending downwardly therefrom, said lip being aligned with and being coextensive with each of said first lateral, second lateral and back sides of said perimeter surface;

a pair of grapples, each of said grapples being removably coupled to said platform, each of said grapples releasably engaging a top pier rail wherein said platform is configured to be horizontally oriented on the top pier rail thereby facilitating a fish to be positioned on said platform for filleting the fish, each of said grapples being inserted into a respective one of said storage holes for temporary storage, each of said grapples having a first end and a second end, each of said grapples being elongated between first and second ends, each of said grapples having a bend thereon defining a rail space between a first portion and a second portion of said grapples wherein said rail space is configured to have the top pier rail being positioned therein having said bottom surface of said platform resting upon the top pier rail, said bend on each of said grapples being positioned closer to said second end than said first end;

a set of first retainers, each of said first retainers being coupled to said first lateral side of said perimeter surface of said platform, each of said first retainers having a curved portion extending away from said first lateral side, said first retainers being spaced apart from each other and being distributed along said first lateral side, said first portion of a respective one of said grapples being extendable through said curved portion of each of said first retainers having said rail space in said respective grapple being spaced rearwardly from said back side of said perimeter surface;

a set of second retainers, each of said second retainers being coupled to said second lateral side of said perimeter surface of said platform, each of said second retainers having a curved portion extending away from said second lateral side, said second retainers being spaced apart from each other and being distributed along said second lateral side, said first portion of a respective one of said grapples being extendable through said curved portion of each of said second retainers having said rail space in said respective grapple being spaced rearwardly from said back side of said perimeter surface;

a pair of legs, each of said legs being pivotally coupled to said platform, each of said legs extending downwardly from said platform when said legs are positioned in a deployed position wherein each of said legs are configured to abut horizontal pier rails thereby retaining said platform in the horizontal orientation, each of said legs resting against said platform when said legs are positioned in a stored position, each of said legs having a top end, a bottom end and a rear surface extending therebetween, said top end of each of said legs being pivotally coupled to said bottom surface of said platform, said rear surface extending downwardly from said bottom surface of said platform when said legs are positioned in said deployed position wherein said rear surface of each of said legs is configured to abut the horizontal pier rails, said top end of each of said legs being positioned closer to said back side than said front side of said perimeter surface of said platform, each of said legs being positioned adjacent to a respective one of said first and second lateral sides of said perimeter surface;

a plurality of beams, each of said beams being coupled to said bottom surface of said platform, each of said beams extending between said front and back sides of said perimeter surface of said platform, said beams being spaced apart from each other and being distributed between said first and second lateral sides of said perimeter surface;

a locking unit being pivotally coupled between each of said legs and said platform, said locking unit being positionable in a locked position when said legs are positioned in said deployed position, said locking unit retaining each of said legs in said deployed position when said locking unit is positioned in said locked position thereby facilitating said locking unit to support the weight of said platform when said platform is positioned on the top pier rail, said locking unit comprising:

a member extending between each of said legs, said member being centrally positioned between said top and bottom ends of said legs;

a support having a pair of second arms each angling outwardly away from a first arm such that said support has a Y shape, said first arm having a distal end with respect to said second arms, each of said second arms having a distal end with respect to said first arm, said distal end of each of said second arms being pivotally coupled to said member having said first arm being directed away from said support;

a rod extending through each of said beams, said rod being positioned closer to said front side than said back side of said perimeter surface of said platform;

a shaft having a primary end and a secondary end, said primary end being pivotally coupled to said rod having said shaft being centrally positioned with respect to said front side of said perimeter surface, said secondary end being pivotally coupled to said distal end of said first arm of said support, each of said shaft and said first arm being oriented collinear with each other when said legs are positioned in said deployed position such that each of said shaft and said support lie on a line being oriented at an angle with respect to a line extending through said top and bottom ends of said legs, each of said shaft and said support being lying against said bottom surface of said platform when said legs are positioned in said stored position; and a tube being slidably positioned around said shaft, said tube covering an intersection between said shaft and said support when said legs are positioned in said deployed position for retaining said legs in said deployed position, said tube being displaced from said intersection between said shaft and said support thereby facilitating said support and said shaft to be folded to lie against said bottom surface of said platform;

a knife sheath being coupled to said platform wherein said knife sheath is configured to insertably receive a knife for temporary storage, said knife sheath being positioned on said bottom surface of said platform, said knife sheath having an open end for insertably receiving the knife, said open end being aligned with said front side of said perimeter surface of said platform;

a clamp being pivotally coupled to said platform wherein said clamp is configured to engage the fish for retaining the fish on said platform for filleting the fish, said clamp having a first edge and a second edge each extending in opposite directions from a pivot, said pivot being pivotally coupled to said top surface of said platform, said second edge having a plurality of recesses each extending toward said pivot to define a plurality of teeth on said second edge, said second edge being biased to engage said top surface of said platform wherein said second edge is configured to frictionally engage the fish, said first edge being manipulated to pivot said second edge away from said top surface thereby facilitating the fish to be positioned beneath said clamp or to be removed from said clamp, said clamp being positioned adjacent to an intersection of said first lateral side and said front side of said perimeter surface of said platform; and a ruler being coupled to said platform wherein said ruler is configured to measure the length of the fish, said ruler being positioned on said top surface of said platform, said ruler being aligned with and being coextensive with said front side of said perimeter surface of said platform, said ruler having measuring indicia being printed thereon comprising graduated increments of distance.

\* \* \* \* \*